United States Patent [19]
Lin

[11] Patent Number: 5,848,560
[45] Date of Patent: Dec. 15, 1998

[54] BICYCLE PEDAL AND SHOE PLATE ARRANGEMENT

[76] Inventor: Wen-Hwa Lin, No. 41, 36 Rd., Industrial Park, Hsi Tun District, Taichung, Taiwan

[21] Appl. No.: 886,938

[22] Filed: Jul. 2, 1997

[51] Int. Cl.[6] ............................... B62M 3/08; G05G 1/14
[52] U.S. Cl. ............................................................ 74/594.6
[58] Field of Search ............................... 74/594.6, 594.4; 36/131

[56] References Cited

U.S. PATENT DOCUMENTS 5,634,383  6/1997  Lin ........................................ 74/594.6

FOREIGN PATENT DOCUMENTS 3828716    3/1989  Germany ............................. 74/594.6
WO89/06619 7/1989  WIPO ................................. 74/594.6

*Primary Examiner*—Charles A. Marmor
*Assistant Examiner*—Mary Ann Battista
*Attorney, Agent, or Firm*—Varndell Legal Group

[57] ABSTRACT

A bicycle pedal and shoe plate arrangement including a bicycle pedal having a pedal frame and a shoe plate clamp mounted on the pedal frame for securing a shoe plate to the pedal frame, and a shoe plate fixedly fastened to a sole of a shoe and adapted for securing to the shoe to the bicycle pedal, wherein the shoe plate clamp has one end of its front side pivoted to the pedal frame and an opposite end of its front front side connected to a screw tube on a screw rod inside the pedal frame by a spring.

2 Claims, 6 Drawing Sheets

BICYCLE PEDAL AND SHOE PLATE ARRANGEMENT

BACKGROUND AND SUMMARY OF THE INVENTION

The present invention relates to a bicycle pedal and shoe plate arrangment in which the bicycle pedal comprises a hollow pedal frame, a shoe plate clamp pivoted to the pedal frame and adapted for securing the shoe plate to the pedal frame, and a spring connected between the pedal frame and the shoe plate clamp to hold the shoe plate clamp in the close position.

FIG. 1 shows a bicycle pedal, a shoe plate, and a bicycle shoe according to the prior art. The shoe plate is to be fastened to the sole of the bicycle shoe by screws and washers so that the bicycle shoe can be releasably secured to the bicycle pedal. The bicycle pedal, as shown in FIG. 2, comprises a pedal frame having a transverse pivot shaft at its rear side, a shoe plate clamp turned about the transverse pivot shaft of the pedal frame, a connecting member fixedly mounted in the pedal frame at its rear side and having a screw hole, a coupling rod having a rear end inserted through a hole in the shoe plate clamp and a front end terminating in a screw rod threaded into the screw hole of the connecting member, a knob fastened to the rear end of the coupling rod outside the shoe plate clamp, and a spring mounted around the coupling rod and adapted to pull the shoe plate clamp. When the shoe plate is forced in between the pedal frame and the shoe plate clamp, the shoe plate clamp is turned backwards. After the shoe plate has been set into position, the spring force of the spring immediately pulls the shoe plate clamp back to its former position, thereby causing the shoe plate clamp to clamp on the shoe plate. This arrangement is functional, however its complicated structure is expensive to manufacture.

It is the main object of the present invention to provdie a bicycle pedal and shoe plate arrangment which is simple in structure and inexpensive to manufacture. According to the preferred embodiment of the present invention, the bicycle pedal comprises a pedal frame and a shoe plate clamp mounted on the pedal frame for securing a shoe plate to the pedal frame. The shoe plate clamp has one end of its front side pivoted to the pedal frame by a pivot and an opposite end of its front side connected to a screw tube on a screw rod inside the pedal frame by a spring. When the shoe plate is forced in between the pedal frame and the shoe plate clamp, the shoe plate clamp is turned about the pivot, for permitting the shoe plate to be forced into position. When the shoe plate is forced into the position, the spring immediately pulls the shoe plate clamp back, causing the shoe plate clamp to clamp on the shoe plate.

DETAILED DESCRIPTION OF THE PREFERRED EMBODIMENT

Figure 1:
FIG. 1 shows a bicycle pedal, a shoe plate, and a bicycle shoe according to the prior art.
Figure 2:
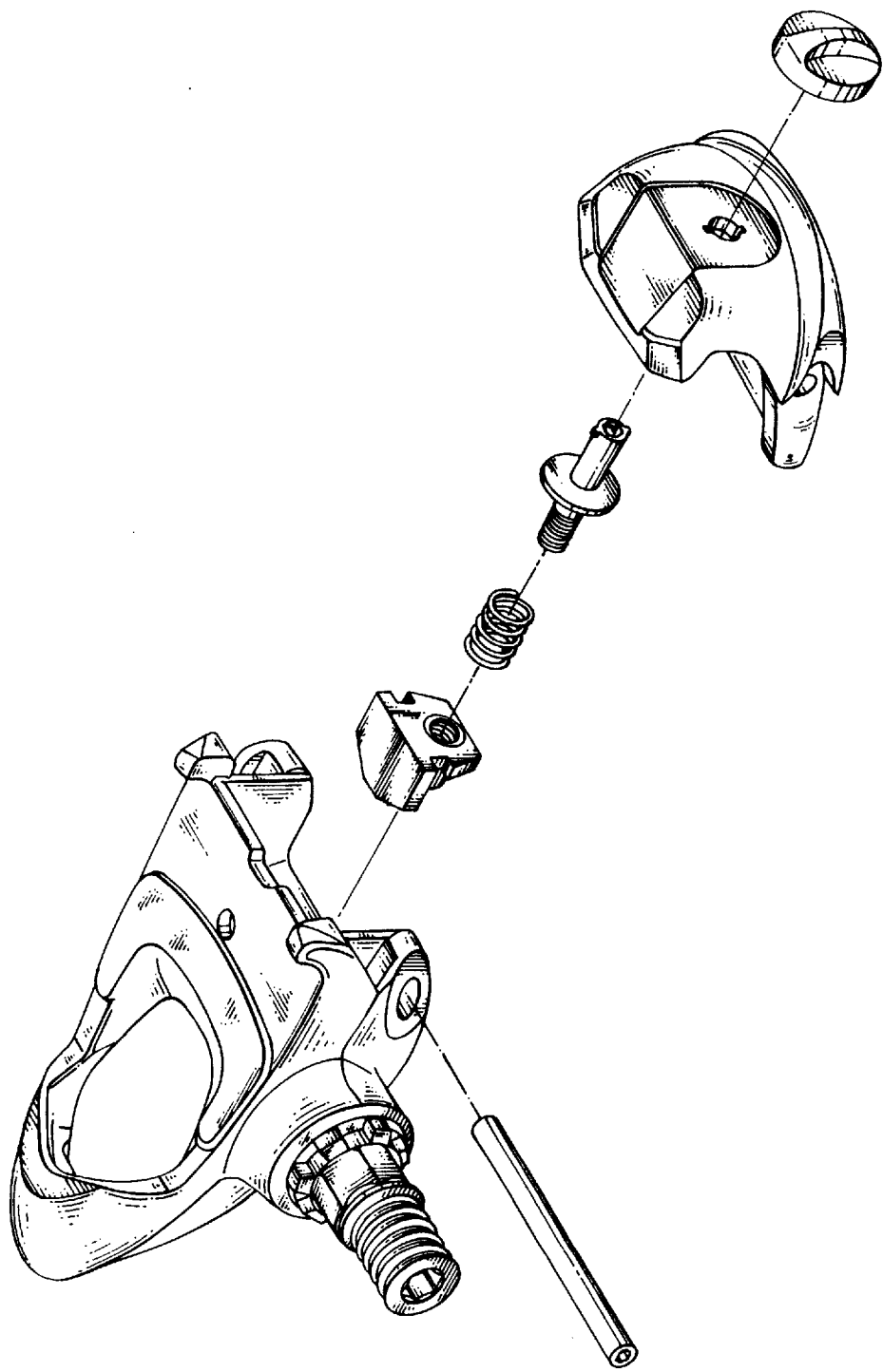
FIG. 2 is an exploded view of the bicycle pedal shown in FIG. 1.
Figure 3:
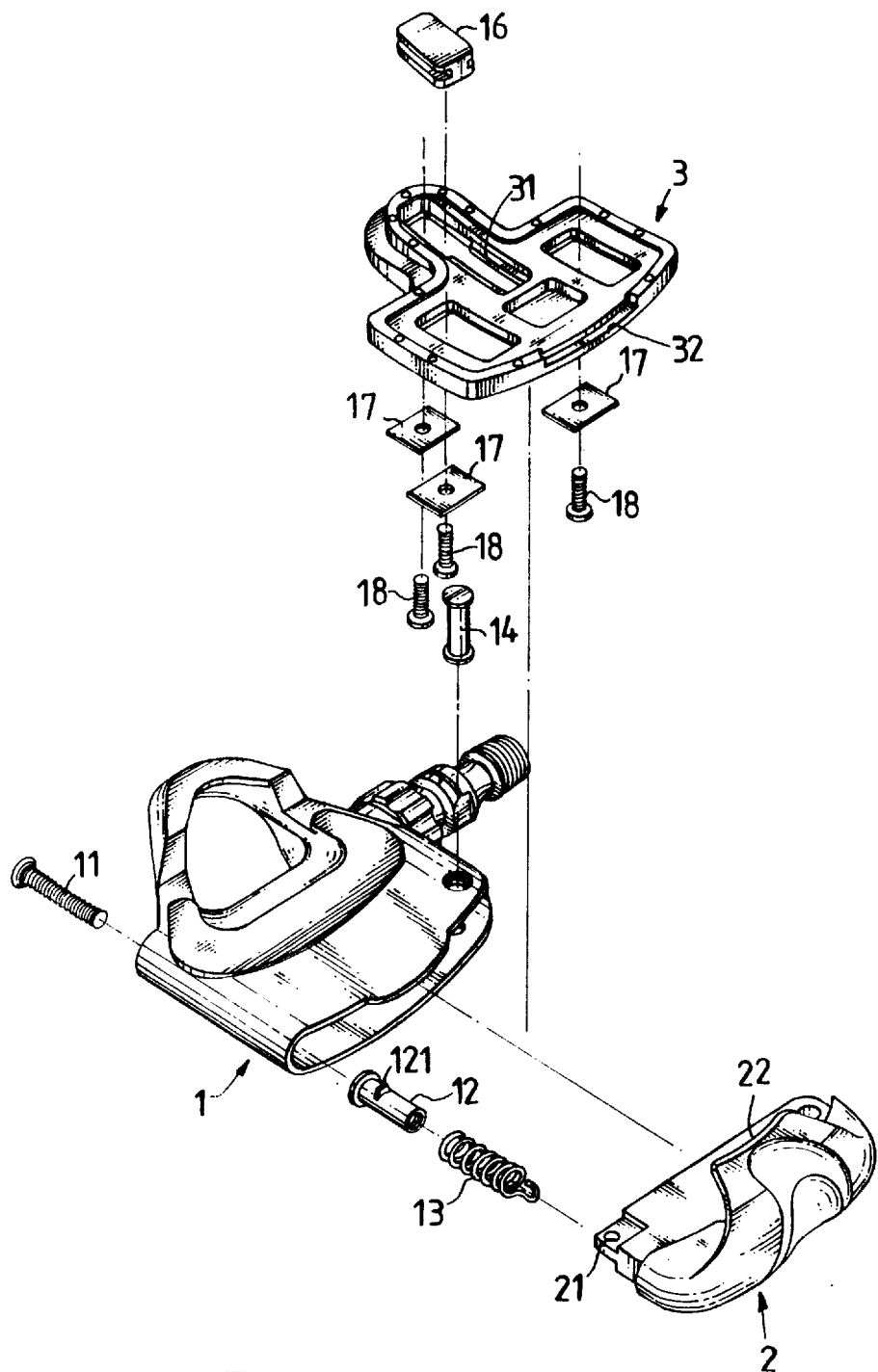
FIG. 3 is an exploded view of a bicycle pedal and a shoe according to the present invention.
Figure 4:
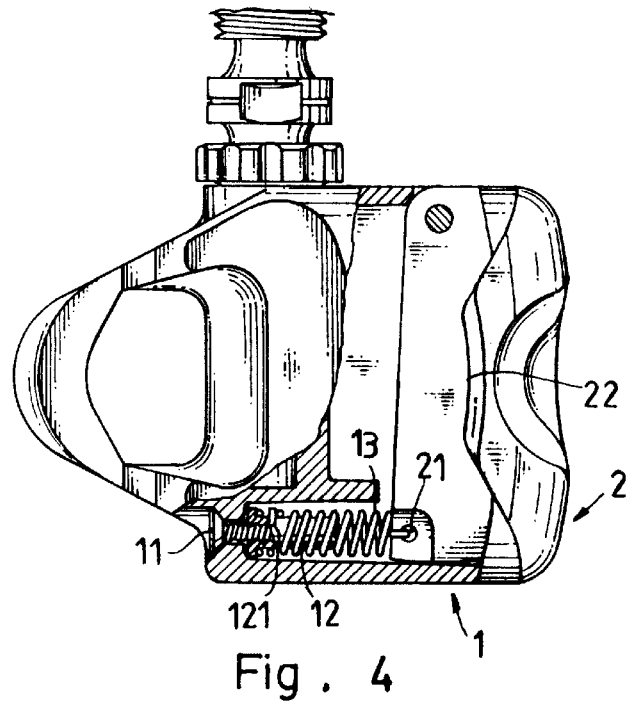
FIG. 4 is a top view in section of the bicycle pedal according to the present invention.

Referring to FIGS. from 3 to 7, a bicycle pedal in accordance with the present invention comprises a hollow pedal frame 1 having a through hole 15 longitudinally disposed near its outer side, a screw rod 11 mounted in the through hole 15 of the pedal frame 1, a screw tube 12 threaded onto the screw rod 11 and having a flange 121 raised from its periphery. a shoe plate clamp 2 pivoted to one end of the rear side of the pedal frame 1 by a pivot 14 and having a coupling hole 21 at one end of its front side remote from its pivoted point to the pedal frame, and a spring 13 having one end fastened to the flange 121 of the screw tube 12 and an opposite end fastened to the coupling hole 21 of the shoe plate clamp 2. The shoe plate, referenced by 3, is adapted to be fastened to a bicycle shoe by screws 18 and washers 17, having a ribbed front opening 31, an anti-skid block 16 mounted in the ribbed front opening 31, and a rear retaining groove 32. The shoe plate clamp 2 further comprises a curved retaining flange 22 adapted for engaging the rear retaining groove 32 of the shoe plate 3.

Figure 5:
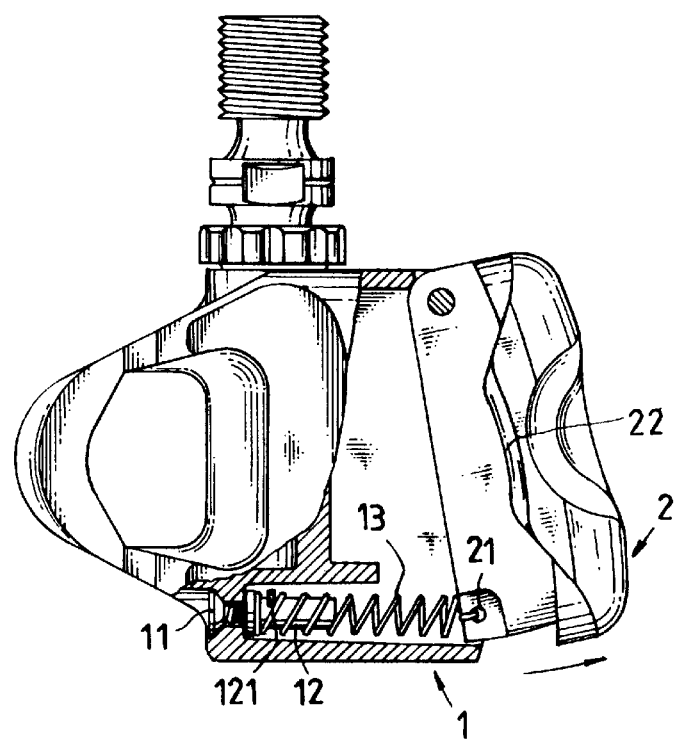
FIG. 5 is similar to FIG. 4 but showing the shoe plate clamp turned outwards.
Figure 6:
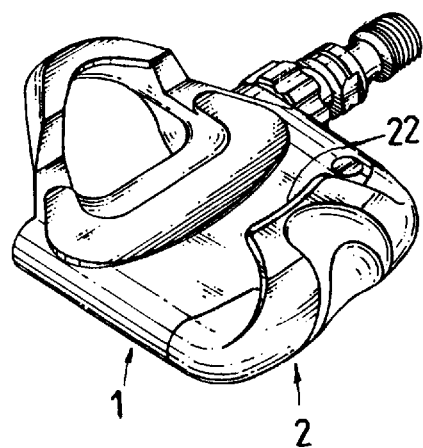
FIG. 6 is an elevational assembly view of the bicycle pedal according to the present invention.
Figure 7:
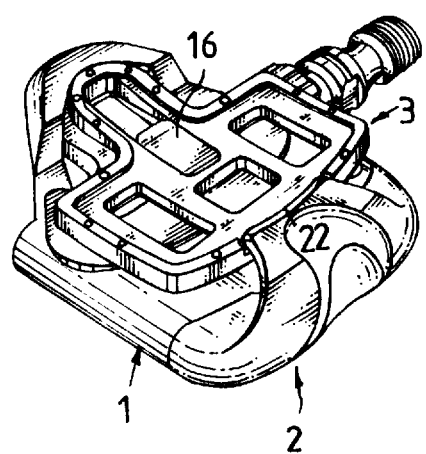
FIG. 7 shows the shoe plate secured to the bicycle pedal according to the present invention.
Figure 8:
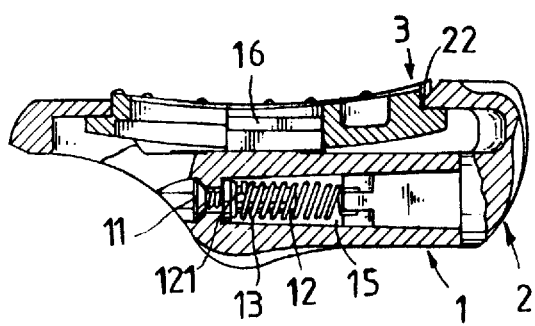
FIG. 8 is a side view in section of FIG. 7.

When the shoe plate clamp 2 is pushed backwards from the pedal frame 1 by the shoe plate 3 (which is fixedly fastened to the sole of the shoe), it is turned about the pivot 14, for permitting the shoe plate 3 to be forced into position (see FIG. 5). When the shoe plate 3 is set into position, the spring 13 immediately pulls the shoe plate clamp 2 back to its former position, thereby causing the curved retaining flange 22 of the shoe plate clamp 2 to be forced into engagement with the retaining groove 32 of the shoe plate 3, and therefore the shoe plate 3, namely, the shoe is firmly secured to the bicycle pedal (see FIG. 7 and 8). Further, the anti-skid block 16 prevents the shoe plate 3 from sldiing.

I claim:

1. A bicycle pedal and shoe plate arrangement comprising a bicycle pedal having a pedal frame and a shoe plate clamp mounted on said pedal frame for securing a shoe plate of a sole of a shoe to said pedal frame, wherein said pedal frame comprises a pivot at one end of a rear side thereof, a screw rod longitudinally disposed at one lateral side remote from said pivot, a srew tube threaded onto said screw rod and having a flange raised from the periphery, and a spring having a front end fastened to said flange of said screw tube and a rear end; said shoe plate clamp having one end of a front side thereof pivoted to said pivot, and opposite end of its front side connected to the rear end of said spring, and a curved retaining flange which is adapted to engage with a rear retaining groove of said shoe plate when said shoe plate is attached to said pedal frame.

2. The bicycle pedal and shoe plate arrangment of claim 1, wherein an anti-skid block is adapted to be mounted in a ribbed front opening of said shoe plate.

* * * * *